United States Patent [19]
Billingsley et al.

[11] Patent Number: 5,478,628
[45] Date of Patent: Dec. 26, 1995

[54] NON-WOVEN FLUORESCENT RETROREFLETIVE FABRIC

[75] Inventors: Britton G. Billingsley, St. Paul, Minn.; Vera L. Lightle, Hudson, Wis.; David P. Swanson, Woodbury, Minn.; Claus Jansen, Kaarst, Germany

[73] Assignee: Minnesota Mining and Manufacturing Company, St. Paul, Minn.

[21] Appl. No.: 240,075

[22] Filed: May 9, 1994

Related U.S. Application Data

[63] Continuation of Ser. No. 884,792, May 18, 1992, abandoned.

[51] Int. Cl.⁶ .................. B32B 5/14; B32B 3/00; B32B 5/16
[52] U.S. Cl. ............. 428/171; 428/172; 428/283; 428/284; 428/296; 428/290
[58] Field of Search ................ 428/171, 172, 428/283, 284, 402, 406, 407

[56] References Cited

U.S. PATENT DOCUMENTS

| | | | |
|---|---|---|---|
| D. 277,808 | 3/1985 | Nichols | D2/27 |
| D. 280,860 | 10/1985 | Monferrato | D2/27 |
| D. 281,028 | 10/1985 | Nichols | D30/37 |
| D. 294,535 | 3/1988 | Stricklin | D2/185 |
| 3,111,677 | 11/1963 | Artzt | 2/84 |
| 3,665,518 | 5/1972 | Leadford | 2/88 |
| 3,700,305 | 10/1972 | Bingham | 350/105 |
| 3,710,396 | 1/1973 | Tomlinson | 2/197 |
| 3,865,235 | 2/1975 | Levy et al. | 206/286 |
| 3,946,443 | 3/1976 | Knight | 2/82 |
| 4,067,067 | 1/1978 | Neuls | 2/84 |
| 4,118,802 | 10/1978 | Polster | 2/84 |
| 4,202,053 | 5/1980 | Bell | 2/84 |
| 4,313,229 | 2/1982 | Villafañe | 2/84 |
| 4,328,533 | 5/1982 | Paredes | 362/108 |
| 4,390,096 | 6/1983 | Goldenberg | 206/390 |
| 4,472,835 | 9/1984 | Clark | 2/102 |
| 4,533,592 | 8/1985 | Bingham | 428/213 |
| 4,763,985 | 8/1988 | Bingham | 350/105 |
| 4,783,856 | 11/1988 | Bouwens et al. | 2/87 |
| 5,128,804 | 7/1992 | Lightle et al. | 359/515 |
| 5,162,160 | 11/1992 | Matsui et al. | 428/290 |

FOREIGN PATENT DOCUMENTS

| | | |
|---|---|---|
| 30039/89 | 9/1989 | Australia . |
| 0481634A1 | 4/1992 | European Pat. Off. . |
| 2280156 | 2/1976 | France . |
| 2511937 | 3/1983 | France . |
| 8328374 U | 1/1984 | Germany . |
| 8706107 U | 10/1987 | Germany . |
| 2-112459 | 4/1990 | Japan . |
| 1078623 | 8/1967 | United Kingdom . |

OTHER PUBLICATIONS

German Industry Standard No. DIN 30 711.
International Standard No. ISO 6330–1984(E).
Hoban, Robert F., *Fluorescence Measurements by the Two-Mode Method*, Tappi, vol. 57, No. 7, pp. 97–100 (Jul. 1974).
NPS–V, CENT/TC 162, No. 84.
AATCC Test Method 143–1984, *Appearance of Apparel and Other Textile End Products After Repeated Home Launderings*, AATCC Technical Manual (1988).
AATCC Test Method 88C–1987, *Appearance of Creases in Durable Press Items After Repeated Home Laundering*, AATCC Technical Manual (1988).

(List continued on next page.)

*Primary Examiner*—George F. Lesmes
*Assistant Examiner*—Kathryne E. Shelborne
*Attorney, Agent, or Firm*—Gary L. Griswold; Walter N. Kirn; Karl G. Hanson

[57] ABSTRACT

A high visibility fabric having a non-woven web material with a fluorescent layer. The fluorescent pigment concentration in the fabric is greater proximate a designated fabric outer surface than at other outer surfaces of the fabric. The fabric is used for manufacturing safety vests, signage, and other articles requiring high visibility.

22 Claims, 10 Drawing Sheets

OTHER PUBLICATIONS

AATCC Test Method 124–1984, *Appearance of Durable Press Fabrics After Repeated Home Laundering*, AATCC Technical Manual (1988).

*Guide to Nonwoven Fabrics*, INDA (1978).

Evans, R., *Chromatic Notes*, Journal of Color and Appearance, p. 4 (1972).

NON-WOVEN FLUORESCENT RETROREFLETIVE FABRIC

This is a continuation of application Ser. No. 07/884,792 filed May 18, 1992 now abandoned.

FIELD OF THE INVENTION

This invention relates to high visibility fabric having a non-woven web material with a fluorescent layer. The fluorescent pigment concentration in the fabric is greater proximate a designated fabric outer surface than at other outer surfaces of the fabric. The fabric is used for manufacturing safety vests or signage requiring high visibility.

BACKGROUND OF THE INVENTION

Fluorescent clothing utilizing fabric with fluorescent pigments is well known. Generally these fabrics are heavy in weight and contain either a uniform concentration of fluorescent pigment, or a coating of fluorescent material on only one surface.

The term "fluorescent layer", as used herein, refers to the entirety of the fluorescent-pigment-containing resin attached to the web. The layer is bounded by a typically irregular designated outer surface adjacent which the fluorescent pigment is preferentially concentrated, and by a second irregular surface, opposite from the designated outer surface, wherein the second surface is defined by the resin that penetrates and surrounds the fibers of the porous web.

The only known non-woven web material used for fluorescent articles contains fluorescent pigment which is dispersed in the web material so that inner and outer surfaces of the web material appear substantially equally fluorescent. The fluorescent web material articles have high areal density values and experience significant mechanical breakdown after only a few domestic laundering cycles. When retroreflective material is added to fluorescent fabric, the visibility of the article generally increases. However, the combination of fluorescent fabric and retroreflective material produces an article with even higher total areal densities and weight.

SUMMARY OF THE INVENTION

The invention is a high visibility fabric comprising a non-woven web material and a fluorescent layer. The non-woven web material has fusibly interbonded thermoplastic fibers. The fluorescent layer consists of fluorescent pigment in a cross-linked resin bonded to the non-woven web to create a concentration of fluorescent pigment proximate a designated outer surface of the non-woven web. The fluorescent pigment concentration is greater proximate the designated outer surface than at other surfaces of the web. The resin surrounds and reinforces the bonds forming the fusibly bonded thermoplastic fibers.

A method of manufacturing a high visibility fabric is disclosed comprising the steps of providing a non-woven web material and applying a partial layer of retroreflective material to portions of the non-woven web material. A preferred non-woven web material comprises the fusibly interbonded thermoplastic fibers and fluorescent layer material described above. The application of a partial layer of a retroreflective material to portions of a designated outer surface of the non-woven web material creates a lightweight fabric exhibiting high visibility to an observer.

Another method of manufacturing high visibility fabric is disclosed which is suitable for large scale manufacturing of the fabric. This method has a first step of blending a plurality of fiber types to form a continuous length of non-woven web. The first type of fiber is a high melting temperature fiber and the second type of fiber is a high melting temperature core fiber with a lower melting temperature sheath fiber. A next step is to thermally bond the web, with a subsequent step of coating a surface of the thermally bonded web with a resin containing fluorescent pigment. The final step is to dry the coated web to create a concentration of fluorescent pigment proximate a designated outer surface of the non-woven web. The fluorescent pigment concentration is then greater proximate the designated outer surface than at other surfaces of the web.

A lightweight limited wear high luminance safety vest is manufactured using the non-woven web material and fluorescent layer as described above. The safety vest comprises a vest body with an upper torso section and a waist section. The upper torso section and the waist section each have a posterior and an anterior portion. Retroreflective strips are selectively applied to an outer surface of the vest body to further enhance visibility of the vest to an observer.

BRIEF DESCRIPTION OF THE DRAWINGS

FIG. 7b is a rear view of the safety vest shown in FIG. 7a.

DETAILED DESCRIPTION OF THE INVENTION

The use of fluorescent materials as highlighting agents in textiles and fabric manufacture has developed over many years. Numerous articles exist for safety purposes which include fluorescent pigments applied in various manners. Also, the use of non-woven fabrics has been in existence for many years, and with a marked increase in use of such fabrics within the last three decades.

The inventors of the present invention have recognized numerous problems associated with combinations of non-woven web materials and fluorescent pigment materials. These problems include high areal density web fabrics which are saturated or coated with fluorescent pigments. The fabrics present weight and storage problems, and are not very durable in laundering cycles. In addition to a mechanical breakdown of the fabric, substantial color transfer of the fluorescent materials occurs. The color transfer phenomenon occurs to some extent when these fabrics are used as outdoor garments during inclement weather. In such cases, it is likely that the wearer of such fabrics will experience color transfer of fluorescent pigment causing discoloration of undergarments worn by the wearer.

A non-woven web material may be used for high visibility fabric manufacture which does not experience the color transfer problem as described above. When combined with a layer or partial layer of retroreflective material, the fabric becomes a very high visibility fabric useful for garments, banners, and other products relating to safety concerns.

Figure 1:
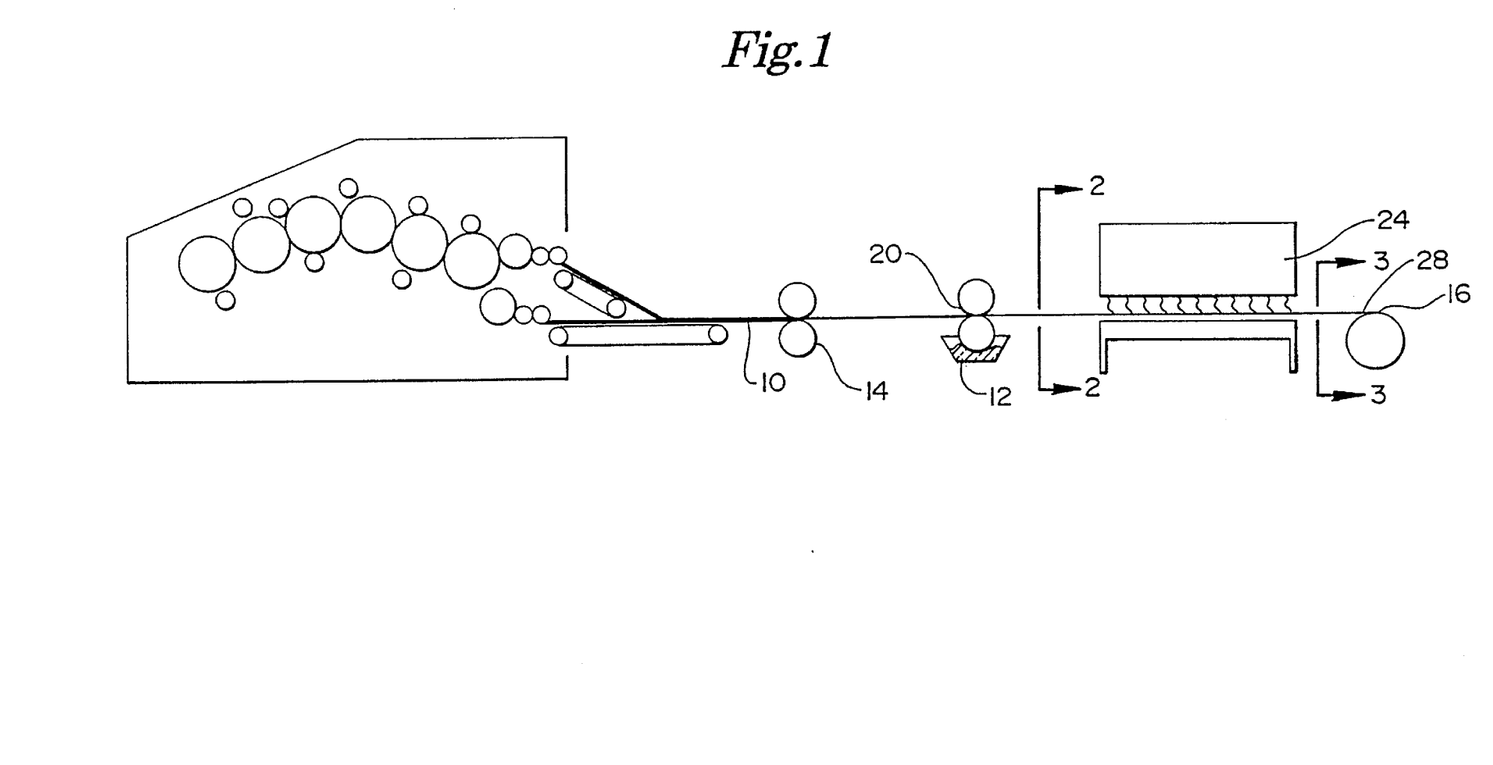
FIG. 1 is a schematic of the process cycle for applying a fluorescent layer to non-woven web material.

FIG. 1 illustrates a method of manufacturing a high visibility fabric comprising a non-woven web material 10 which has fusibly interbonded thermoplastic fibers. The thermobonding of these fibers occurs at various sites represented by thermobonding site 14. Various non-woven web materials and constructions may be selected for manufacturing non-woven web fabric. Preferred materials are selected from a group consisting of carded web, air-laid web, hydro-entangled web, spun bonded web, melt blown web, and wet laid web materials. After thermobonding of the non-woven web material is completed, the web material is passed through coating station 20 where a resin binder 12 is applied. Resins suitable for use as binders include urethanes, polyesters, acrylics, vinyls, silicones, fluropolymers, polyamides or combinations thereof. The resin applied to web material 10 has a high saturation color pigment or a fluorescent pigment incorporated therein.

Figure 2:
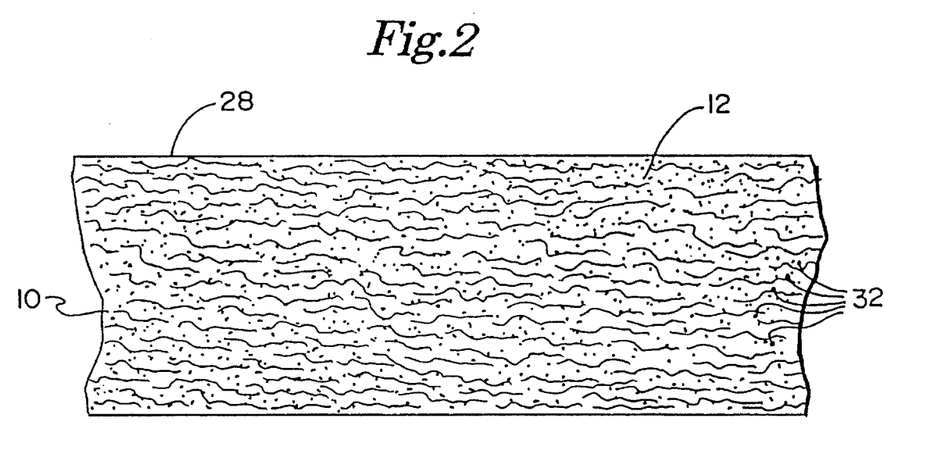
FIG. 2 is a schematic cross section of a non-woven web material having uniform distribution of a fluorescent pigment throughout the web material.
Figure 3:
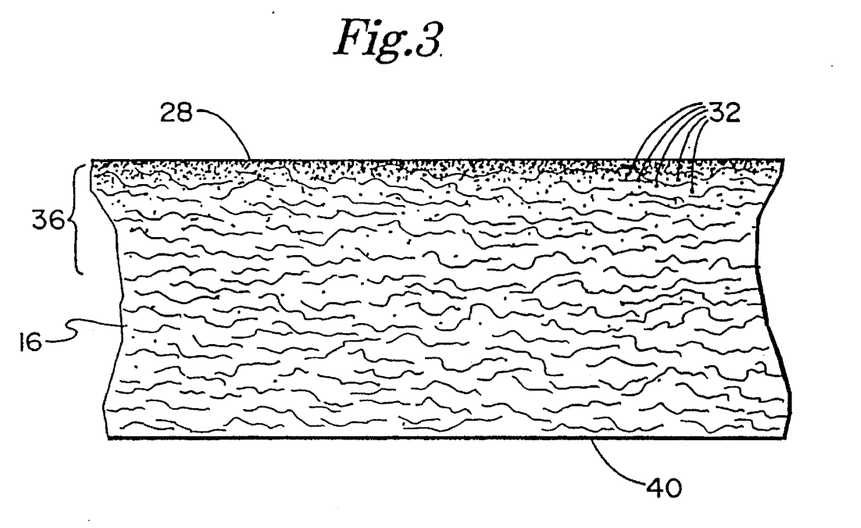
FIG. 3 is a schematic cross section of a non-woven web material having a migrated layer of fluorescent material located proximate a designated outer surface of the web material.

In FIG. 2, a cross section of web material 10 is shown containing a generally uniform distribution of binder 12 and fluorescent pigment 32. Referring again to FIG. 1, the saturated web material 10 is then passed through drying means 24 where a heated gas is applied to a designated outer surface 28 of non-woven web material 10. Preferably the web is located relative to a flow path of heated gas so that designated outer surface 28 is contacted by a greater flow volume of heated gas than other web surfaces. The effect of applying drying means 24 to web material 10 in the manner described is to evaporate the water at surface 28 and create binder and pigment migration toward surface 28. FIG. 3 discloses a cross section of the non-woven web material, binder, and pigment. FIG. 3 shows the pigment concentration effect of the heat applied to the designated outer surface 28.

The more particular result of this migration process is a fluorescent layer 36 consisting of fluorescent pigment 32 in a cross linked resin bonded to the non-woven web material 10 to create a fluorescent fabric 16 having a concentration of fluorescent pigment 32 proximate designated outer surface 28 of the fabric. The concentration of fluorescent pigment 32 is greater at designated outer surface 28 than at other surfaces, such as designated inner surface 40, of the web. A two sided coloring effect is produced in fabric 16, so that one side receives the majority of pigment and therefore has a very bright fluorescent appearance. By comparison, the other side or inner surface is pale. One advantage of producing fluorescent colored non-woven web material fabric 16 in this manner is to enable use of less fluorescent pigment while still achieving at least the same fluorescent color performance as in a web that is uniformly coated with pigment 32. A second advantage of this manufacturing process and the resulting article is to use fabric 16 in making garments where undesired color transfer is a problem. Placement of the lightly colored side of fabric 16 immediately adjacent a wearer of a garment manufactured with fabric 16 helps avoid color transfer from the fabric to the body or undergarments of the wearer. This is particularly useful in a setting in which the wearer may be perspiring or is subject to high humidity.

A preferred concentration of fluorescent pigment proximate designated outer surface 28 is greater than 50% of the total amount of fluorescent pigment in the non-woven web material. Fabric 16 preferably comprises a total fluorescent pigment concentration of less than 10 grams per square meter, and more preferably comprises a concentration of between 2 grams per square meter and 8 grams per square meter. An even more preferable fluorescent pigment concentration is between 2 grams per square meter and 5 grams per square meter. Various fluorescent colors may be used to advantage with fabric 16.

After formation of fluorescent layer 36, designated outer surface 28 preferably has an original spectral reflected radiance of greater than or equal to 100% measured in a range of wavelengths between 400 nanometers and 700 nanometers using D-65 illuminant and with a 0°/45° geometry. A more preferred original spectral reflected radiance for designated outer surface 28 is between 120% and 190% with the measurements taken at 600 nanometers using the above illuminant and geometry. An even more preferred original spectral reflected radiance is between 170% and 190%, with the measurements taken at 600 nanometers using D-65 illuminant and 0°/45° geometry.

A preferred alternate fluorescent color demonstrates an original spectral reflected radiance of between 120% and 150%, with a most preferred radiance of about 140%. These measurements are at a range of between 520 nanometers and 530 nanometers, also using D-65 illuminant and 0°/45° geometry.

High visibility fabric 16 is a lightweight fluorescent fabric manufactured for excellent mechanical durability and color fastness, as measured according to methods and procedures of the International Standards Organization. Preferably fabric 16 retains greater than 50% of the original value of spectral reflected radiance following up to about 10 domestic washing and drying cycles, using, for example, a Maytag brand top loading washing machine at settings of regular action, medium load, 10 minute wash cycle at about 45° C., and a cold water rinse cycle. The detergent used is ⅔ cup of Tide brandname, and ballast comprises ten 100% cotton towels each measuring about 0.5 meter width and 0.9 meter length. Fabric 16 is able to retain mechanical durability and color fastness under most normal wash settings, which may include temperatures higher than the above nominal example.

Although non-woven web materials having different total areal densities may be chosen for use in manufacturing fabric 10, advantages exist to using fabric having lower total areal densities. In the case of manufacturing portable high visibility garments or signage, it is helpful to have a lighter weight fabric. Limited use or limited wear articles are also an excellent application of the lightweight fabric technology disclosed in this invention. For example, a limited use safety vest may be produced which is lightweight and relatively inexpensive to manufacture compared to long life durable and high strength vests typically worn by those required to be near vehicular traffic on a routine basis. In addition, a limited use high visibility fabric 16 may be ideal for storage and use during infrequent emergency situations. As manufacturing processes are changed as a result of this invention to produce less expensive safety garments and devices, it is possible to encourage greater use of those items to improve the health and safety of a larger population.

In the example of a safety vest manufactured using fabric 16, it is important that the vest meet the same standards of light reflectance as more durable vests, but the vest must also be compact for storage. In addition, fabric 10 must be manufactured to reduce the risk of staining a user's clothing by concentrating the fluorescent pigment at the designated outer surface 28 of the fabric rather than at an inner surface. This is particularly advantageous for situations in which vehicle operators wearing formal clothing encounter emergency situations and must use the safety vest.

To encourage greater use of fabric 16 in the manufacture of improved safety vests according to this invention, the fiber content of the non-woven web material is designated as a reduced weight and lower density material. Fabric 16 preferably comprises a total areal density of between 20 grams per square meter and 200 grams per square meter, with a more preferable density of between 50 grams per square meter and 70 grams per square meter.

Figure 4:
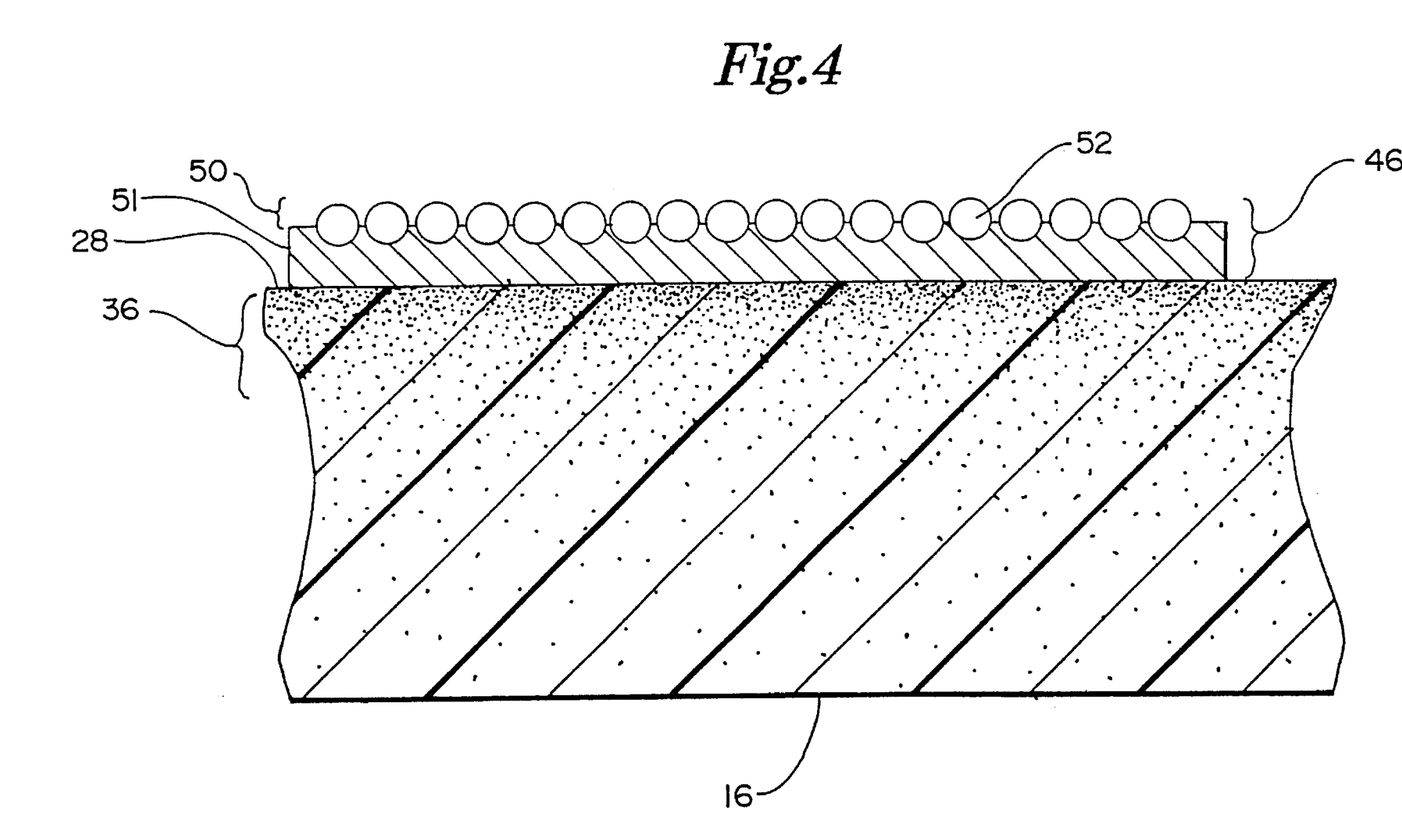
FIG. 4 is a schematic cross section of a non-woven web material with a partial layer of retroreflective material bonded to a designated outer surface of the web material.

An optimum combination of reduced manufacturing cost, increased visibility, and reduced weight is accomplished with fabric 16. However, to further enhance the visibility of articles manufactured using fabric 16, a partial layer 46 of retroreflective material 50 and resin 51 is selectively applied to areas of the fabric, preferably at designated outer surface 28, as shown in FIG. 4. Retroreflective material 50 may be selected from a variety of enclosed or exposed lens materials which include glass beads, cube corners, resin beads, resin hemispheres, and other known retroreflective materials. Although the partial layer of retroreflective material increases density and weight to an article produced with these materials, articles using fabric 16 remain relatively lightweight. For example, fabric 16 and partial layer 46 of retroreflective material 50 and resin 51 have a combined total areal density of between 100 grams per square meter and 300 grams per square meter, with a preferred density of between 100 grams per square meter and 250 grams per square meter. A most preferred density is 240 grams per square meter.

Partial layer 46 comprises close packed retroreflective elements 52 in the resin 51 that is cross linkable to the resin forming binder 12 at fluorescent layer 36. Retroreflective elements 52 are preferably packed as closely as possible, ideally in their closest hexagonal arrangement, to achieve greater brightness. These elements may be so arranged by any convenient transfer process, such as printing, transferring, screening, cascading, or with a hot can roll. Preferred arrangements include cascading and transfer, and will be discussed later.

Figure 5:
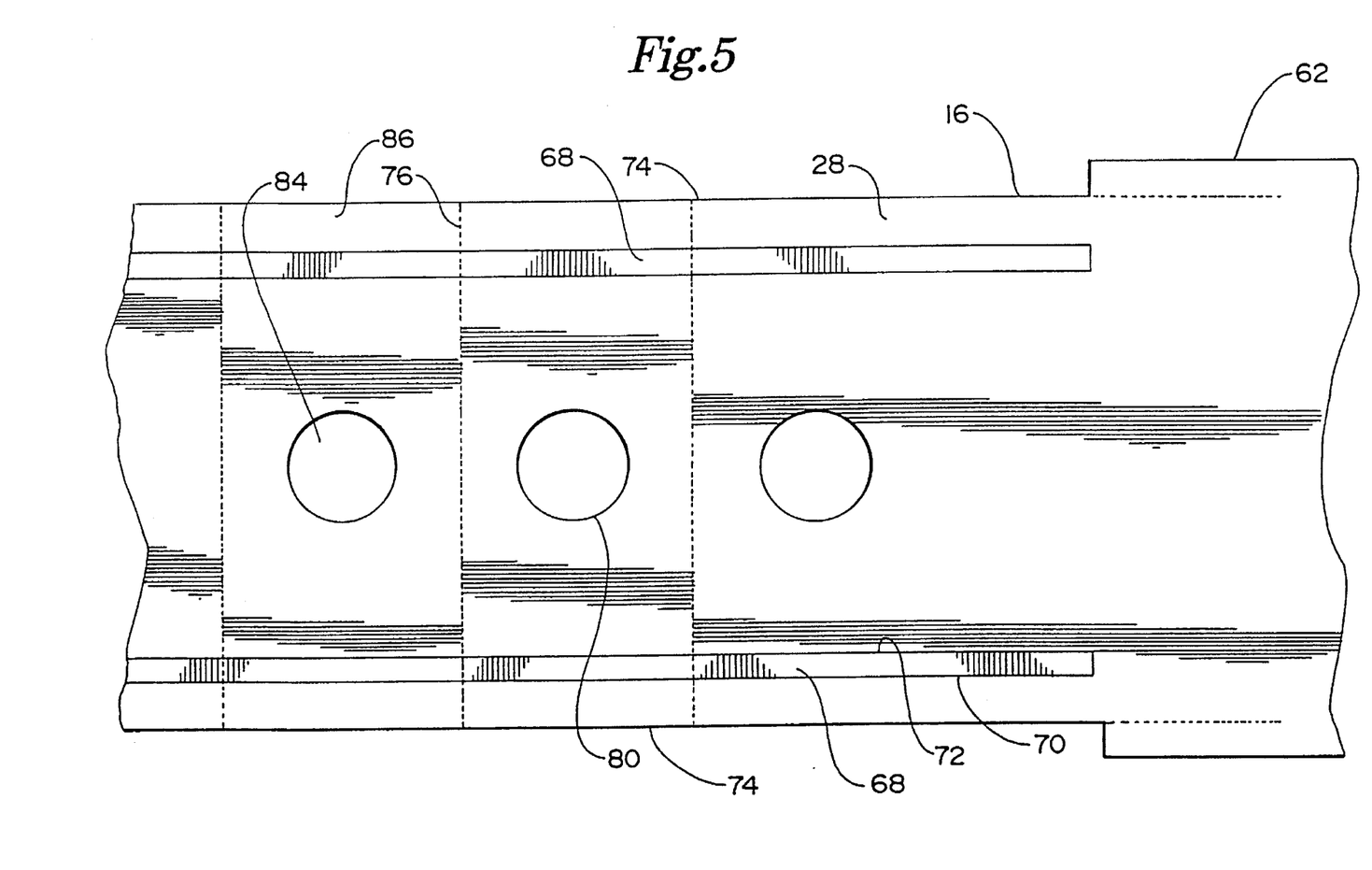
FIG. 5 is a schematic plan view of a designated surface of a non-woven web fabric shown separating from a substantially continuous roll of the fabric, with strips of retroreflective material applied to the designated outer surface of the fabric.

FIG. 5 illustrates in schematic form a top plan view of a fabric roll 62 for providing a substantially continuous supply of fabric 16 arranged, preferably, in a continuous sheet having a width W. Retroreflective material in the form of strips 68 are efficiently applied, preferably in a continuous roll manner, to designated outer surface 28 of fabric 16. Parallel sides 70, 72 of strips 68 extend parallel to sides 74 of the sheet of fabric 16. Other orientations are possible for strips 68, for example in a diagonal manner relative to sides 74. Other shapes and configurations of retroreflective partial layer 46 may be applied to fabric 16. Indeed, as disclosed in Example 4 and FIG. 8, application of a retroreflective pattern or logo 69 is advantageously performed using a screen printed adhesive process or similar masking, spraying, and rolling techniques onto individual sections of a non-woven fabric or retroreflective elements on a carrier. The resins used in this method of practicing the invention may be partially cured, for example, in the non-woven fabric and within the carrier for the retroreflective elements. A totally cured resin in the fabric may also be bonded to a partially cured resin in the carrier. These techniques are alternatives to the above described die-cutting and laminating method of applying a selected pattern of retroreflective elements.

FIG. 5 further discloses lines 76 representing locations of cross-roll or cross-sheet cuts or scores accomplished by known techniques for manufacturing continuous roll products. Circle 80 represents the location and pattern of a die-cut or similar cut which is made in fabric 16 to create a patterned article, for example, a vest as described above. A cut along circle 80 separates fabric section 84 from fabric section 86 with the latter section resulting in a wearable article of manufacture. Fabric section 84 may be further cut into strips or other shapes for use as an attaching member or other purposes related to the use of high visibility fabric. As shown in FIG. 5, a simple and inexpensive process of manufacturing lightweight high luminance fluorescent safety vests is taught. Absent the circular cut pattern 80, a high luminance polygon shaped article is manufactured which is useful as a high luminance flexible fluorescent sign. Further examples will be discussed and shown later.

Figure 6A:
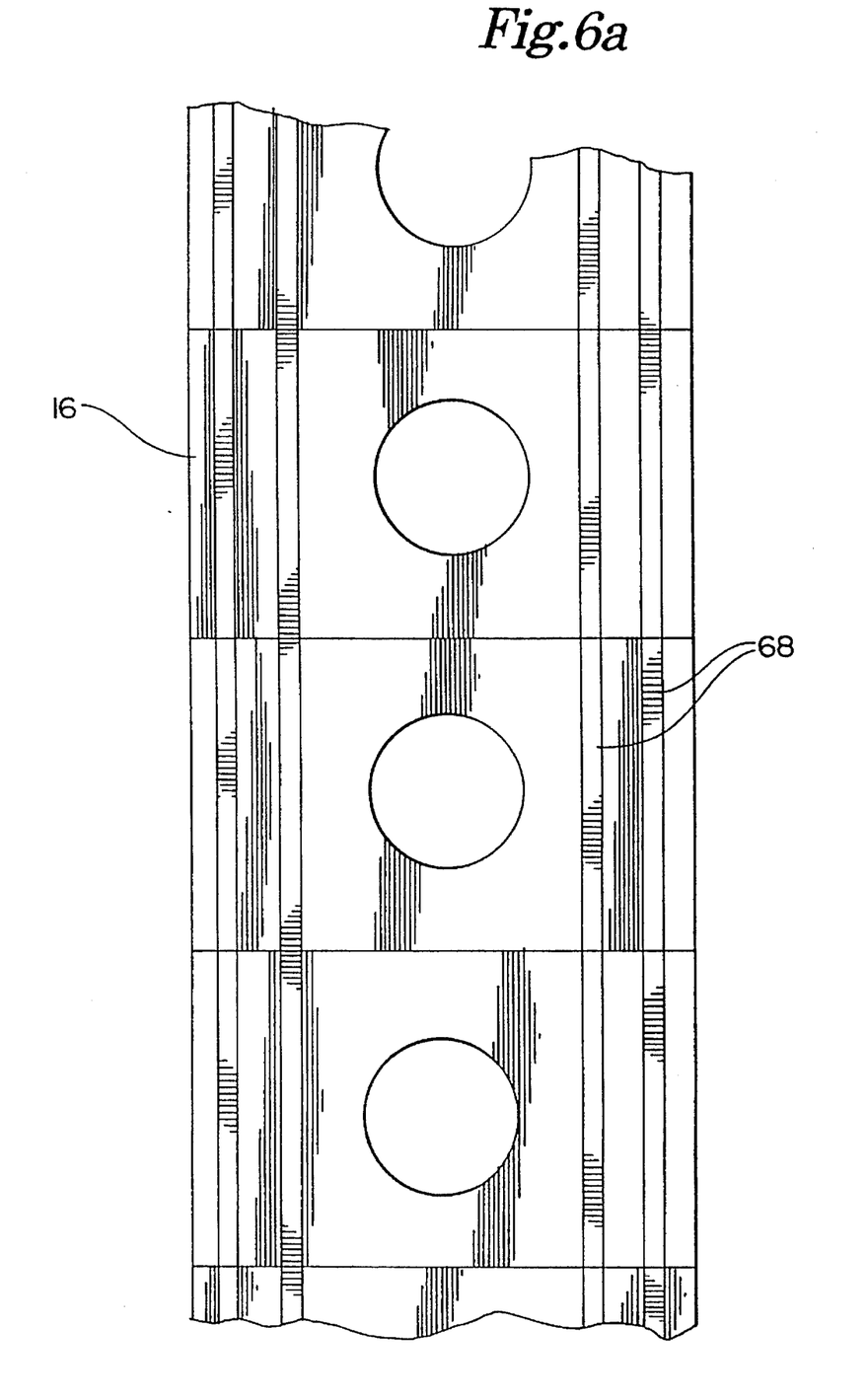
FIG. 6a is a top plan view of an embodiment of reflective vests manufactured from a substantially continuous roll supply of non-woven web material.

FIG. 6a is a top plan view of fabric 16 and strips 68 configured as a substantially continuous sheet of rolled non-woven web and retroreflective material. FIG. 6a is similar to FIG. 5, but a plurality of retroreflective strips are shown.

Figure 6B:
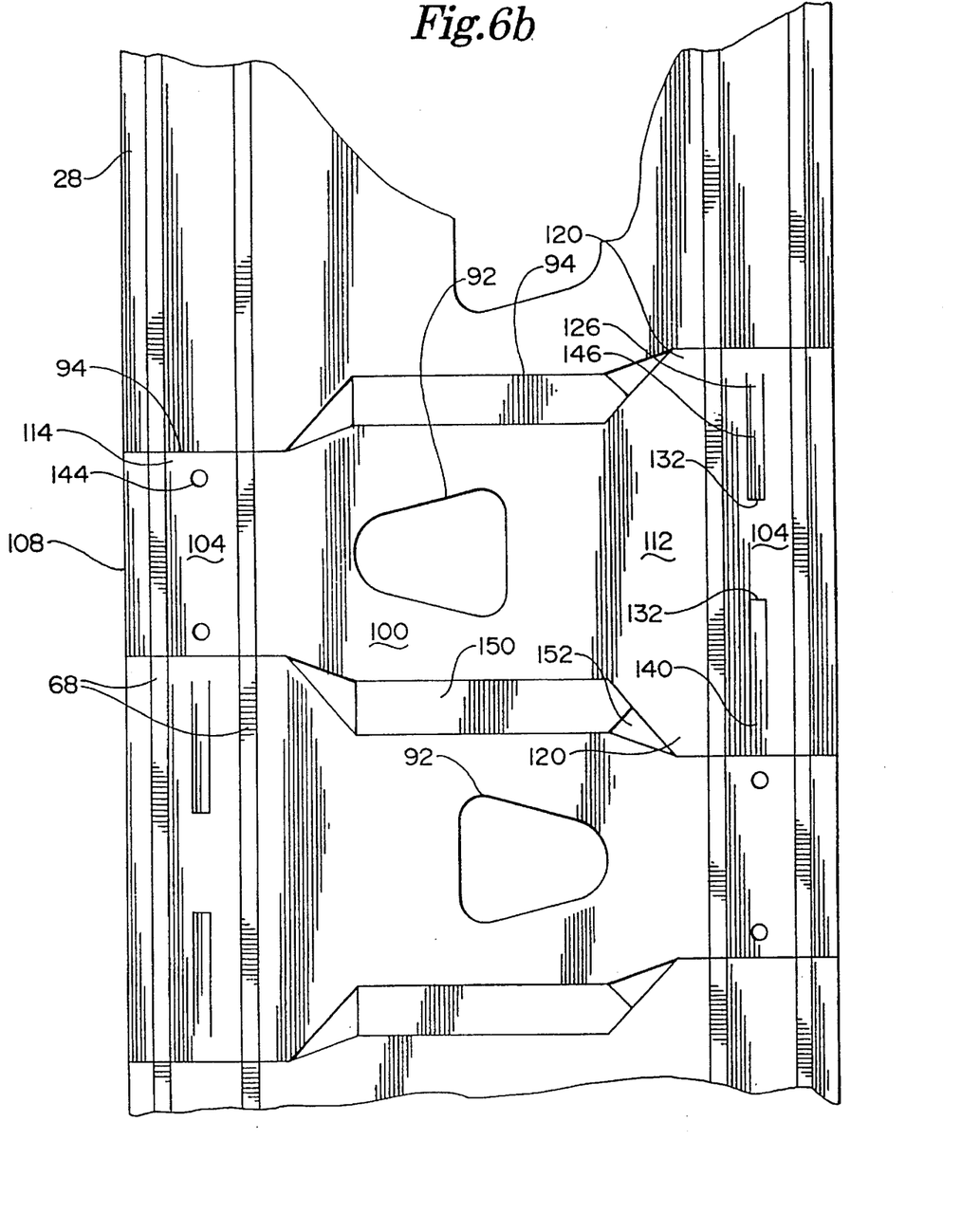
FIG. 6b is a top plan view of an embodiment of reflective vests manufactured from a substantially continuous roll supply of non-woven web material.

FIG. 6b is also a top plan illustration of high luminance safety articles being manufactured according to the processes disclosed above. FIG. 6b discloses the above described high visibility fabric, retroreflective strips 68, die-cut holes 92, and cross cut lines 94. The article manufactured according to the process shown in FIG. 6b is an asymmetrically configured vest 108 with an upper torso section 100 and a waist section 104. The upper torso section 100 and the waist section 104 each comprise a posterior and an anterior portion. The material of the vest comprises the non-woven web material and fluorescent layer according to the embodiments disclosed above. The retroreflective strips 68 are applied to designated outer surface 28 so that an outer surface of the vest body will demonstrate enhanced visibility of the vest to an observer.

The vest illustrated in FIG. 6a shows symmetrically shaped waist section anterior and posterior portions. However, the embodiment of FIG. 6b illustrates a high luminance safety vest 108 which comprises asymmetrically shaped waist section anterior and posterior portions. Posterior portion 112 has a larger surface area than anterior portion 114.

Posterior portion 112 also has lateral extensions 120 for extending vest 108 from the posterior of a wearer in an anterior direction around the wearer's hips. Attaching means are provided for attaching the vest to other articles or to itself. For example, attaching means may comprise tie members 126 attachable to vest waist section 104 and designed for connection to another part of vest 108. In the embodiment illustrated in FIG. 6b, tie members 126 are connected to waist section 104 and posterior portion 112 at each tie member end 132. Tie member end 140 is scored or partially cut away from vest 108 during manufacture and is then passed through hole 144 in the waist section anterior portion to maintain vest 108 upon the wearer. Tie members 126 include an optional retroreflective outer surface layer 146 to further enhance the visibility of the wearer of vest 108. Fabric sections 150, 152 are useful as high visibility tie members, pennants, carry bags for vest 108, or other applications requiring a high visibility lightweight fabric.

Figure 6C:
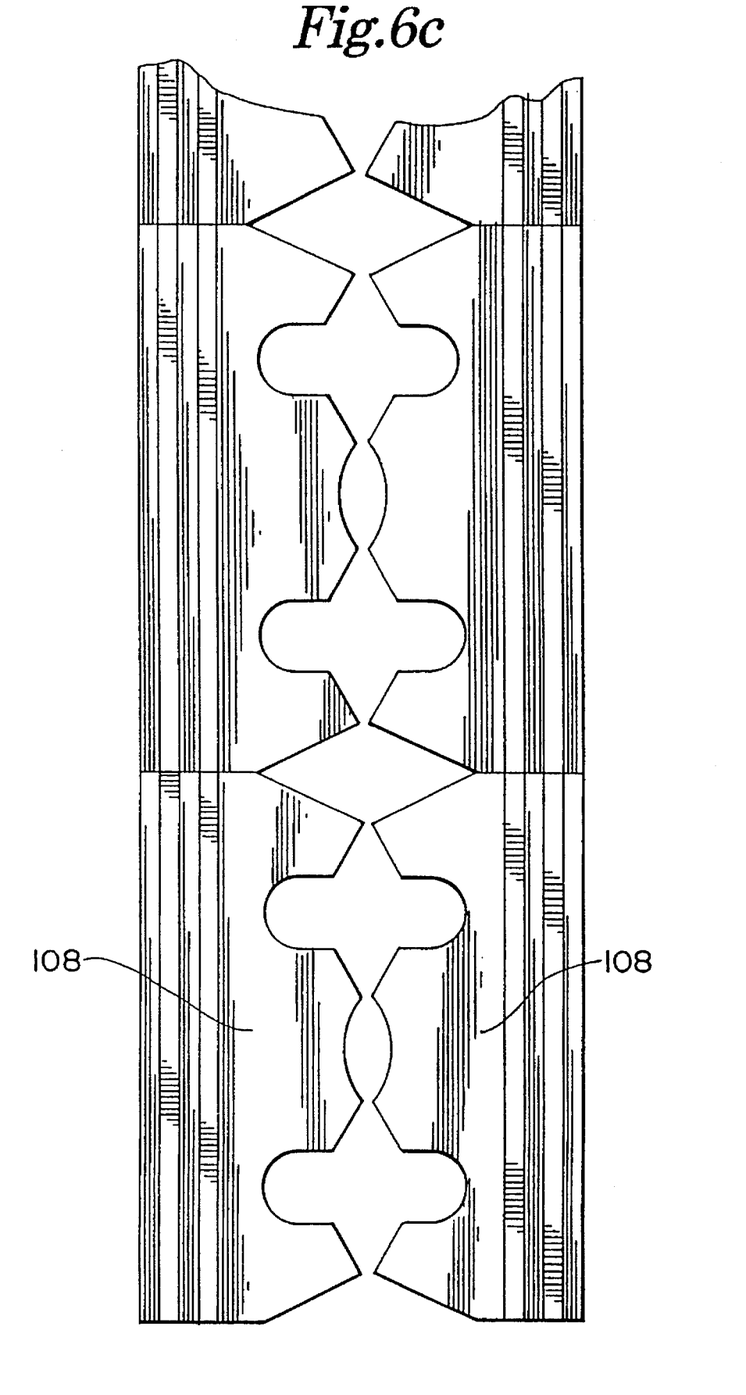
FIG. 6c is a top plan view of an embodiment of reflective vests manufactured from a substantially continuous roll supply of non-woven web material.

FIG. 6c is another embodiment of a cross-roll cut manufacturing process for products made using the high visibility fabric described above. In this embodiment, the safety vests 108 are configured lengthwise along the sheet of fabric.

Figure 7A:
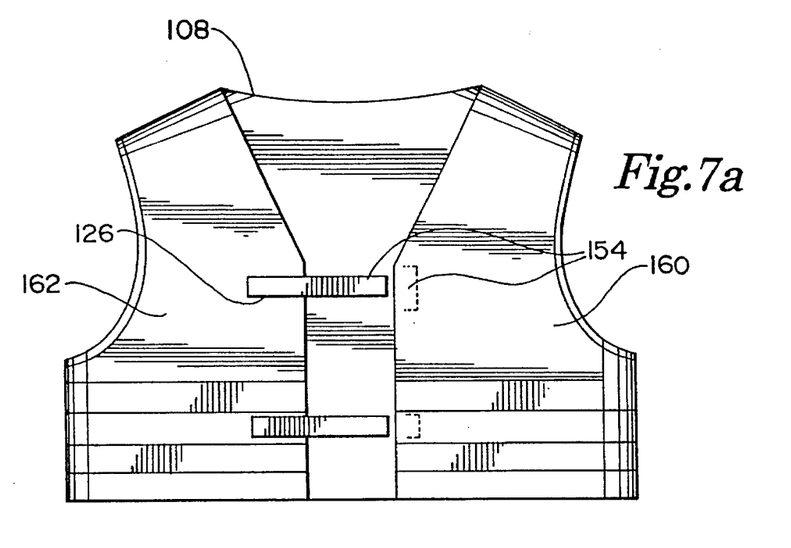
FIG. 7a is a front view of a safety vest manufactured using the fluorescent fabric and retroreflective material of this invention.
Figure 7B:
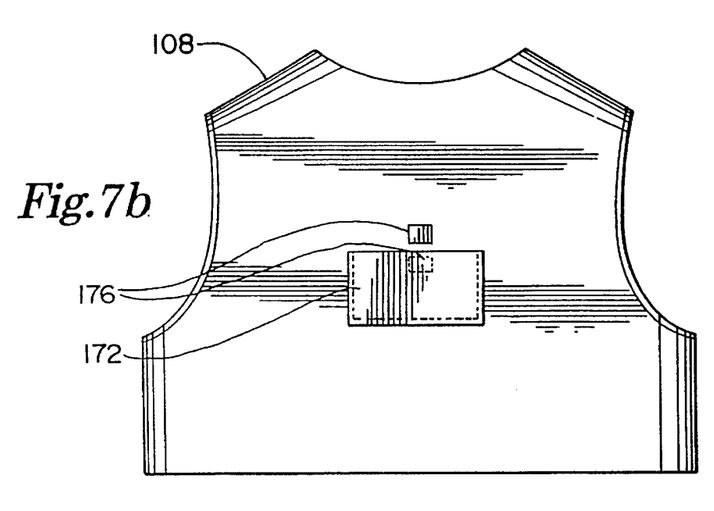

FIG. 7a is another embodiment of a high visibility safety vest 108 which is manufactured according to the processes described above, but which includes hook and loop fastening means 154 to close the left and right anterior portions 160, 162 of the vest. FIG. 7b is a posterior view of vest 108 showing an outer pocket 172 into which may be folded the remainder of vest 108 when not in use. Closure means 176, such as a hook and loop fastener, is provided for closing outer pocket 172.

Figure 8:
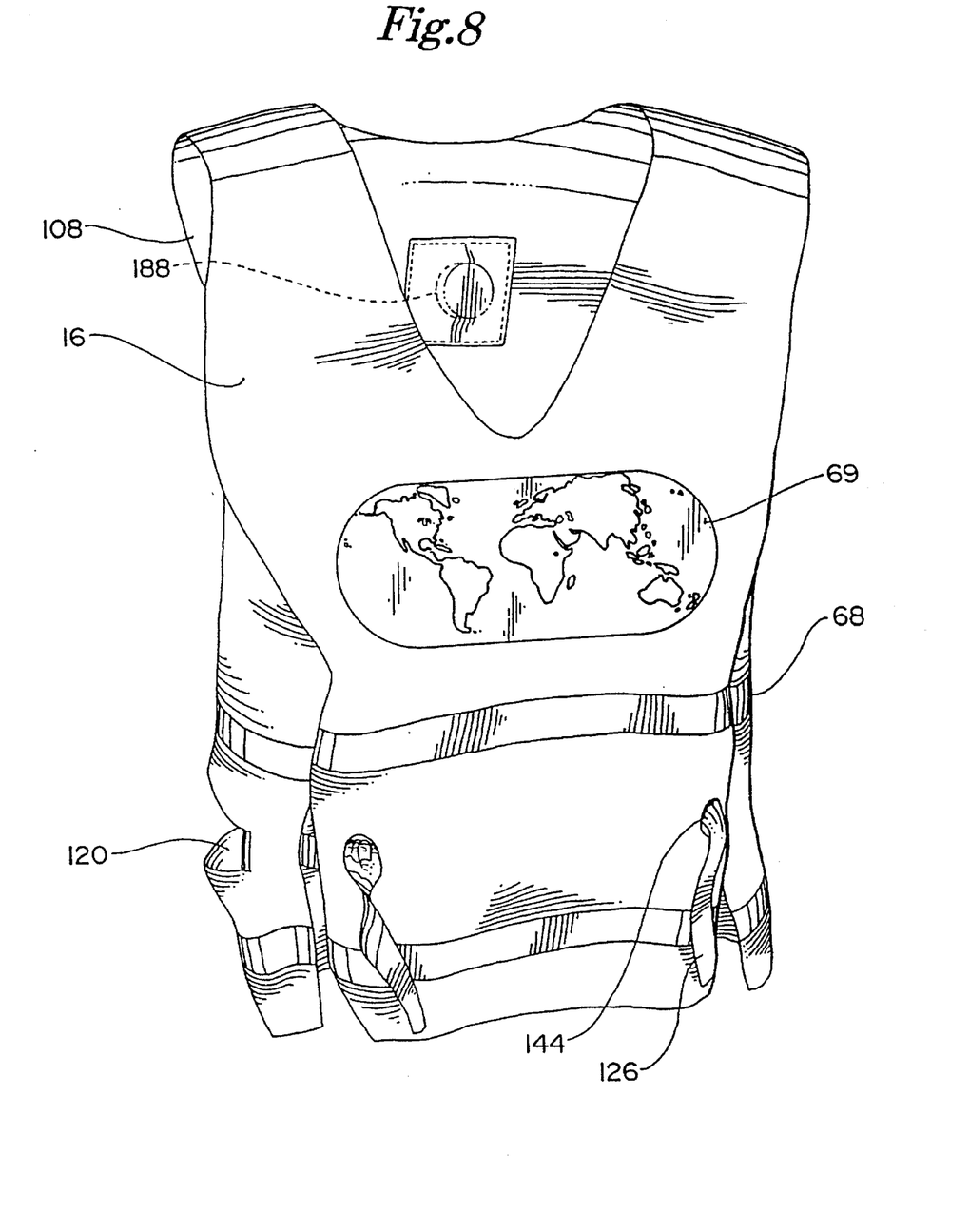
FIG. 8 is a perspective view of a wrap-around lightweight safety vest using the high visibility fabric of this invention.

FIG. 8 is a perspective view of vest 108 manufactured according to the cut patterns of FIG. 6b. Vest 108 is a high visibility, high luminance safety vest made of lightweight materials. Fabric 16 with strips 68 has a brightness value of greater than 65 candelas per square meter per lux, with a preferred value greater than 200 candelas per square meter per lux, and a more preferred value of greater than 250 candelas per square meter per lux. The cross linkable resins and the bonding methods used with retroreflective strips 68 and the non-woven web fabric 16 create excellent strength and durability characteristics for retaining the bonds between the two materials, even after repeated laundering. Retroreflective logo 69 also demonstrates these characteristics. High luminance safety vest 108 is ideal for compact storage in anticipation of emergency use or other uses. Its added advantages include retroreflectively coated tie members 126 which are designed for dangling, contrasting motion relative to the reflective strips 68 attached to the main body of vest 108. This further heightens the visibility of a wearer of vest 108, during reduced visibility situations. Anterior holes 144 may be sized to discourage movement of tie members 126 therethrough, or to restrict tie members 126 from pulling out of holes 144 when in use. Lateral extensions 120 provide optimum side visibility of vest 108.

FIG. 8 also includes a fragment view of a portion of vest 108 having a magnetized element 188. Magnetized element 188 may be applied to a vest or even to a scrap of fabric 16 which might otherwise be discarded. When applied to a fabric remnant, element 188 permits use of the fabric in a manner which enhances the visibility of the device that the remnant is attached to. In an emergency setting, even a glimpse of enhanced visibility may create a lifesaving advantage. This portion of FIG. 8 is intended to demonstrate means of achieving even a minute degree of enhanced visibility by providing a specialized fabric remnant or article of manufacture which is readily applied to magnetizable metal surfaces, such as steel, via magnetized element 188.

Figure 9:
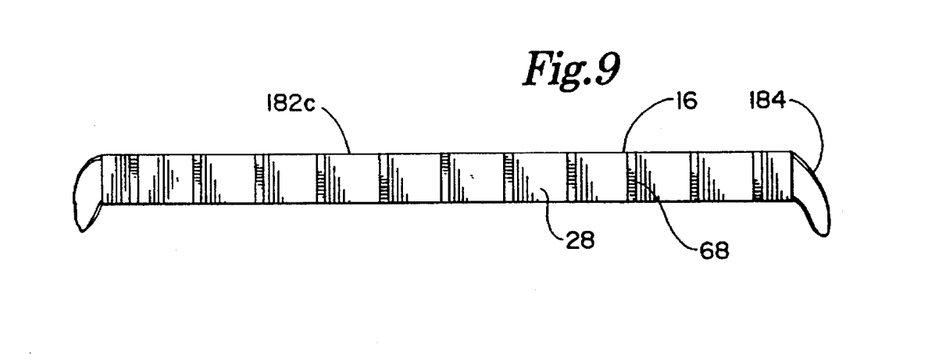
FIG. 9 is a front view of a banner manufactured with high visibility fabric and loop attaching means at either end of the banner.

FIG. 9 shows an elongate sheet of high visibility fabric 16 with retroreflective strips 68 bonded to a designated outer surface 28 to form a high visibility sign or banner 182. High visibility banner 182 is useful for placement on a fender of a vehicle which is in a situation requiring warning or attention, such as a situation of which a vehicle is inoperative. Banner 182 may be attached to a bumper or fender of a vehicle by use of attaching means 184, which may be elastic loops or other structures. Banner 182 is useful in many other applications, for example, for advertising, portable signage, or hazard prevention.

Figure 10:
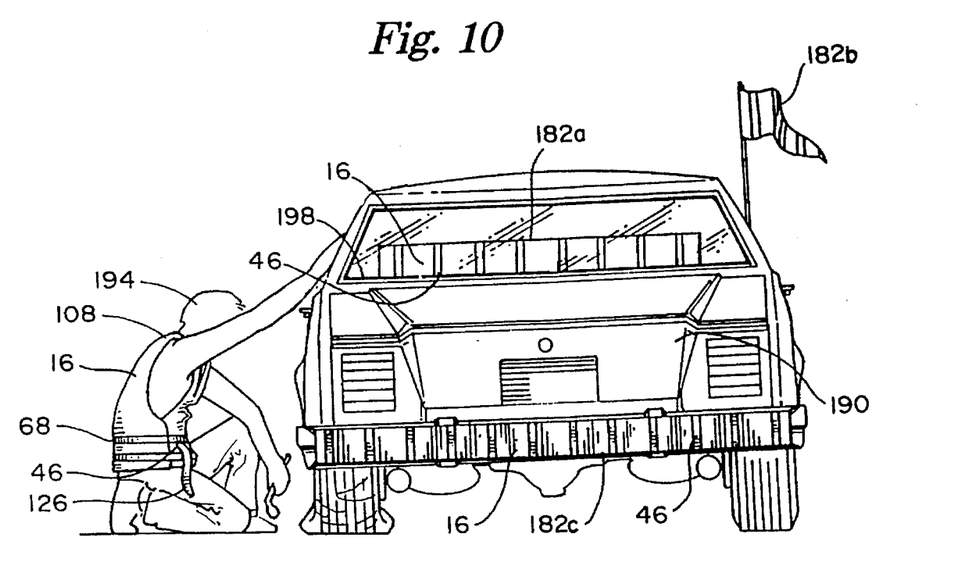
FIG. 10 is an elevation view of a vehicle and operator outfitted with a safety vest, bumper and rear window banners, and an antenna banner manufactured using the high visibility safety fabric of this invention.

FIG. 10 illustrates in simple form the powerful effect of using high visibility fabric 16 to alert approaching vehicular traffic to a stationary vehicle 190 and a vehicle operator 194 outside of the vehicle. In this example, both the vehicle and the operator are positioned in a hazardous location relative to approaching traffic. Use of high visibility fabric 16, including retroreflective partial layer 46 in the form of strips 68 or other patterns, greatly enhances the visibility of the operator and the vehicle.

Banners 182 are readily carried within a small compartment inside of vehicle 190. Before operator 194 exits the vehicle it is possible to create enhanced visibility and warnings of an emergency situation to oncoming drivers. A first banner 182a is positioned on the interior rear ledge 198 of vehicle 190 with the high visibility outer surface 28 of the banner facing oncoming traffic through a rear window of the vehicle. A similar banner may be placed in other windows as well. Then, after donning high visibility vest 108 within vehicle 190, the operator is able to exit the vehicle and move to the vehicle antenna location(s) to mount high luminance, high visibility banner 182b. The operator then attaches banner 182c to the bumper of vehicle 190 to create a multi-tiered warning system which comprises fixed and movable highly visible elements. A further demonstration of the hazard reduction capabilities of fabric 16 is shown by the excellent visibility of vehicle operator 194, even when positioned in a side aspect, to oncoming traffic. This is enhanced by providing retroreflective coatings onto tie members 126 to create a visual image of relatively fixed and relatively movable retroreflective and fluorescent elements.

EXAMPLE 1

A colored non-woven fabric is manufactured as described above using a pigmented latex solution. The latex is applied by a variety of processes including curtain coating, foam coating, roll coating, roto-screen printing, or knife coating. The latex is used as a carrier for the pigment as well as for excellent mechanical strength. A thickening agent may also be added to achieve desired viscosity, which affects color intensity and uniformity.

A preferred latex binder solution in this example has the following formulation:

| Component | Parts by Weight |
| --- | --- |
| HA-8 solids (A copolymer of ethyl acrylate and methylol acrylamide available from Rohm & Haas Company under the tradename Rhoplex ®) | 8.93 |
| RM 825 thickener (A nonionic ethylene-oxide based urethane block copolymer, available from Rohm & Haas Company under the tradename | 3.57 |

-continued

| Component | Parts by Weight |
|---|---|
| Acrysol ® | |
| Fluorescent pigment (EXP 5263 or EXP 5261 available from Cardinal Color Inc.) | 3.57 |
| Water | 83.93 | and is applied to non-woven web material and then heat dried at a temperature range of about 148°–176° C. for up to about 2 minutes.

Color difference data is collected using a CR-210 colorimeter, manufactured by the Minolta Corporation, on the L, a, and b color coordinate system. The data of Table 1 illustrates, for selected samples showing a notable two sided effect, the color difference that can be achieved between designated outer surface 28 and designated inner surface 40 using the process of this invention:

TABLE 1

| | Boldly Colored Side | | | Lightly Colored Side | | |
|---|---|---|---|---|---|---|
| Sample | L | a | b | L | a | b |
| 1 | 77.35 | 83.67 | 77.08 | 78.68 | 75.25 | 61.78 |
| 3 | 79.81 | 73.64 | 68.28 | 80.34 | 69.40 | 60.96 |
| 5 | 81.73 | 59.91 | 59.82 | 82.11 | 57.75 | 55.05 |
| 6 | 79.22 | 70.71 | 69.13 | 80.02 | 67.44 | 61.29 |
| 8 | 80.84 | 71.18 | 66.35 | 81.33 | 66.24 | 56.01 |
| 10 | 79.74 | 74.95 | 69.09 | 80.50 | 69.76 | 59.08 |
| 14 | 80.37 | 68.20 | 67.82 | 81.04 | 65.81 | 61.82 |
| 15 | 79.73 | 75.27 | 70.11 | 80.37 | 70.40 | 60.21 |
| 19 | 79.84 | 74.68 | 69.10 | 80.68 | 69.02 | 58.81 |

EXAMPLE 2

A retroreflective non-woven construction for fabric 16 comprises a non-woven web material and a retroreflective transfer film. The transfer film adhesive and the interpenetrating binder for the non-woven fibers are preferably of the same chemistry. A preferred embodiment is a non-woven material comprising a blend of a staple, single component fiber and a bi-component fiber, consisting of a high melting temperature core material surrounded by a low melting temperature sheath material. A polyester blend in this example is 70% Hoechst® Celanese 121 and 30% Hoechst® Celanese K53. The K53 is the bi-component polyester with a sheath having a melting temperature of 130° C. and a core which melts at between 250°–268° C. The binder for the non-woven material may be Rohm & Haas Rhoplex® HA-8, and the adhesive for the retroreflective transfer film is identical. A preferred transfer film is made by arranging a monolayer of transparent microspheres of between about 60–100 micron diameter on a temporary carrier that has been coated on one side with a thermoplastic material such as polyethylene. The glass microspheres preferably have a refractive index of about 1.8–2.5, with a 1.9–1.94 value being most preferred. The microspheres are partially embedded in the polyethylene and are vacuum vaporcoated with aluminum. The HA-8 binder is then coated over the vapor coated microspheres. The retroreflective transfer film is then heat laminated to the non-woven web material forming fabric 16 and the carrier sheet is removed.

Utilization of a common chemistry between the binder adhesive of the retroreflective component and the binder of the non-woven web material provides greater strength of the bonds between the retroreflective material and the web material. This construction also permits manufacture of a lower cost product.

EXAMPLE 3

A method of preparing the retroreflective layer 46 comprises use of a self cross-linking acrylic emulsion composition which is cast onto a monolayer of aluminum vacuum coated glass beads on a paper carrier web. The emulsion is dried at approximate web temperatures of 90° C., resulting in a partially cured film of 70 grams per square meter (100 grains per square foot) coating weight and a tensile strength range of 50 grams per inch to 500 grams per inch, with a preferred value of between 100 grams per inch and 300 grams per inch. The paper carrier web which is utilized is coated on one side with a low density polyethylene. The polyethylene side is covered with a monolayer of glass beads, such as shown in retroreflective element 52 of FIG. 4. The glass beads have a refractive index of 1.92 and a diameter ranging from 45 microns to 70 microns. These beads are partially embedded in the polyethylene polymer to a depth of about 30% to 50% of their diameters by heating the web to 138° C. The exposed bead side of the web is vacuum coated with aluminum having a thickness of about 650–700 angstroms.

The self cross-linking acrylic emulsion is prepared with the following formulation:

| Component | Parts by Weight |
|---|---|
| HA-8 solids (A copolymer of ethyl acrylate and methylol acrylamide available from Rohm & Haas Company under the tradename Rhoplex ®) | 39.42 |
| ASE-60 solids (28 weight percent copolymer and 82 weight percent water, available from Rohm & Haas Company, under the tradename Acrysol ®) | 2.06 |
| Foamaster ® DF-160-L (An antifoam agent available from Henkel Corporation) diluted to 50% with water | 0.23 |
| Ammonium nitrate catalyst (diluted with water 10.6:90.4 by weight) | 0.47 |
| Ammonium Hydroxide (aqueous 28–30% weight percent) | 0.31 |
| Silane coupling agent (Available as Z 6040 from Dow Corning Company) | 1.96 |
| Water | 55.55 | and is coated onto the aluminumized beads. A nitrogenous thermosetting resin catalyst may be added to enhance curing. However, in this embodiment the catalyst is omitted in order to maintain a thermoplastic state so that the partially cured film may be heat laminated to a desirable substrate at a later time. The heat of lamination is preferably in a range of between about 93° C. to 205° C. After lamination, the polyethylene coated paper is stripped away exposing the retroreflective elements. It is recognized that other embodiments may comprise thermoplastic films as tie layers to allow for lower temperature transfers. For example, polyester and polyurethane films have been successfully used as tie layers, as well as certain pressure sensitive adhesives.

EXAMPLE 4

A retroreflective logo or graphic, such as depicted in FIG. 8, is applied to fluorescent non-woven fabric. The paper carrier web which is utilized is coated on one side with a low density polyethylene. The polyethylene side is covered with a monolayer of glass beads, such as shown in the retroreflective element 52 of FIG. 4. The glass beads have a refractive index of 1.92 and a diameter ranging from 45 microns to 70 microns. These beads are partially embedded in the polyethylene polymer to a depth of about 30% to 50% of their diameters by heating the web to 138° C. The exposed bead side of the web is vacuum coated with aluminum having a thickness of about 650–700 angstroms. Using the same self-linking emulsion (binder) as in the fabric and as in Example 2 above, the emulsion is screen printed onto the vaporcoated microspheres. The open area of a screen with 92 threads per inch is used to create the graphic or logo image. The non-woven fabric is then laid on to the vapor coat with the printed emulsion between the microspheres and the fabric. The structure is then cured at 121° C. for 10 minutes. The sample is then cooled and the carrier is stripped away leaving the retroreflective image on the non-woven fabric. Retroreflective brightness is between 200 and 400 candelas per lux per square meter.

What is claimed is:

1. A high visibility fabric comprising:
   a) a non-woven web comprising fusibly interbonded thermoplastic fibers; and
   b) a fluorescent layer comprising fluorescent pigment in a cross-linked resin,
wherein the resin penetrates into and is bonded to the non-woven web so as to create a concentration of fluorescent pigment proximate a designated outer surface of the fabric, the fluorescent pigment concentration being greater proximate the designated outer surface than at other surfaces of the fabric, and the resin having portions surrounding the fusibly interbonded thermoplastic fibers and reinforcing the bonds therebetween.

2. The fabric of claim 1, wherein the non-woven web is selected from the group consisting of carded web, air laid web, hydroentangled web, spun bonded web, melt blown web, and wet laid web material.

3. The fabric of claim 1, wherein the cross-linked resin is selected from the group consisting of urethane resin, acrylic resin, polyester resin, silicone resin, fluoropolymer resin, and polyamide resin.

4. The fabric of claim 1, wherein the fabric has a total areal density of between 20 grams per square meter and 200 grams per square meter.

5. The fabric of claim 1, wherein the fabric has a total areal density of between 50 grams per square meter and 70 grams per square meter.

6. The fabric of claim 1, wherein the fabric comprises a fluorescent pigment concentration of less than 10 grams per square meter.

7. The fabric of claim 1, wherein the fabric comprises a fluorescent pigment concentration of between 2 grams per square meter and 5 grams per square meter.

8. The fabric of claim 1, wherein the designated outer surface of the non-woven web material has an original spectral reflected radiance of greater than about 100%, and preferably between 170% and 190%, measured at a range of between 400 and 700 nanometers using D-65 illuminant and 0°/45° geometry.

9. The fabric of claim 1, further comprising a partial layer of retroreflective material selectively applied to areas of the non-woven web at the designated outer surface, the partial layer comprising close packed retroreflective elements in a resin cross-linkable to the resin of the fluorescent layer.

10. The fabric of claim 9, wherein the non-woven web and retroreflective materials have a combined total areal density of between 100 grams per square meter and 300 grams per square meter.

11. The fabric of claim 1, wherein the concentration of fluorescent pigment proximate the designated outer surface comprises greater than 50% of the total amount of fluorescent pigment in the non-woven web.

12. The fabric of claim 9, wherein the retroreflective material has a brightness value of greater than 65 candelas per square meter per lux.

13. The fabric of claim 9, wherein the retroreflective material has a brightness value of greater than 250 candelas per square meter per lux.

14. The fabric of claim 9, wherein the retroreflective material comprises material selected from the list including exposed glass beads, cube corners, resin beads, and resin hemispheres.

15. The fabric of claim 9, wherein the retroreflective material comprises material selected from the list including enclosed glass beads, cube corners, resin beads, and resin hemispheres.

16. The fabric of claim 9, wherein the designated outer surface of the non-woven web has an original spectral reflected radiance of greater than about 100%, and preferably between 170% and 190%, measured at a range of between 400 and 700 nanometers using D-65 illuminant and 0°/45° geometry.

17. The fabric of claims 8 or 16, wherein the fabric remains physically intact and retains greater than 50% of the original value of spectral reflected radiance following up to about ten domestic laundering wash and dry cycles.

18. The fabric of claim 1, wherein the non-woven web comprises a blend of first and second fibers, the first fibers having a high melting temperature and the second fibers comprising core material having a high melting temperature enclosed in a sheath material having a low melting temperature.

19. The fabric of claim 9, wherein the non-woven web is arranged in a substantially continuous roll and the retroreflective material is arranged in at least one continuous strip applied to the web so that parallel sides of the strip extend along the length of the roll.

20. The fabric of claim 9, wherein the non-woven web is arranged in a substantially continuous roll and the retroreflective material is arranged in a continuous strip applied to the web so that sides of the strip are oriented diagonally to the length of the roll.

21. The fabric of claim 9, wherein the non-woven web is arranged in a substantially continuous roll and the retroreflective material is applied to the web as a distinctive logo pattern.

22. The fabric of claim 1, further comprising a flame retardant material.

* * * * *

UNITED STATES PATENT AND TRADEMARK OFFICE
CERTIFICATE OF CORRECTION

PATENT NO.: 5,478,628

DATED: December 26, 1995

INVENTOR(S): Britton G. Billingsley et al.

It is certified that error appears in the above-identified patent and that said Letters Patent is hereby corrected as shown below:

Cover page, item [54], and col. 1, line 2, "RETROREFLETIVE" should read —RETROREFLECTIVE—

Cover page, item [75], delete "Claus Jansen" as an inventor.

Col. 12, line 2, "materials" should be —material—.

Signed and Sealed this

Twenty-first Day of May, 1996

Attest:

BRUCE LEHMAN

Attesting Officer      *Commissioner of Patents and Trademarks*